Patented Feb. 27, 1940

2,191,819

UNITED STATES PATENT OFFICE 2,191,819

TREATMENT OF MANGANESE ORE

Thomas B. Albin, Mercer Island, Wash.

No Drawing. Application April 25, 1938,
Serial No. 204,141

17 Claims. (Cl. 75—1)

The present invention relates to the process of treating manganese silicate ores to reduce the silica to a point where the ore may be used by present commercial processes.

The present invention relates to a process of treating manganese silicate ores which have such large amounts of silica in combination with the manganese that there are at present no important commercial uses for the ore.

At present, no penalty manganese silicate ore or concentrates must have a silica content of less than eight percent; whereas, the manganese silicate ores of the Olympic Peninsula have a silica content, roughly, of twenty to thirty percent. Applicant has invented a new and simple process for reducing the combined silica of such ores to a percent which will be readily acceptable by the trade.

It is an object of the present invention to reduce the amount of combined silica in a high silica content manganese ore to a point where the ore may be used by present commercial processes.

An object of the present invention is the reduction of the amount of silica constituent with manganese in a manganese silicate ore.

Another object of the present invention is the preparation of a manganese silicate ore so that the combined silica will be more readily acted upon by a caustic, an acid, or other reagent.

Another object of the present invention is the preparation of a manganese silicate ore so that the combined silica will be acted upon by sodium hydroxide to form sodium silicate.

Another object of the present invention is the preparation of a manganese silicate ore so that the combined manganese will be easily acted upon by various reagents.

Manganous silicate is a chemical combination of manganese monoxide and silica, with or without water of hydration.

Ores in which the manganese is in a higher state of oxidation than the manganous are those in which the ratio of oxygen directly combined with the manganese is greater than one to one. That is in $MnSiO_3$ the ratio is one to one as two of the oxygens must be considered as preferentially combined with the silica. Such ores in which the manganese is in the higher state of oxidation may be called "manganese ores high in constituent oxygen". Also, the manganese in ores high in constituent oxygen may be called "high valent manganese" as it has a valence greater than two.

Applicant has found that most natural manganese silicate ores are acted upon very little and very slowly by sodium hydroxide to form sodium silicate and thus to reduce the amount of silica combined with the manganese. Applicant has also found that if the amount of oxygen combined with the manganese is increased that the ore may then be treated with the caustic to material advantage.

In accordance with this, applicant has invented the following process for reducing the silica constituent of manganese silicate ores.

The raw manganese silicate ore is comminuted to around 200 mesh or finer; the ore is then subjected to an oxidizing roast at a temperature over 400° F., and up to 850° F. or over; and the silica removed by adding sodium hydroxide to form sodium silicate.

As a specific example, a manganese silicate ore in which the manganese assayed about 36%, the silica 17%, the ferric oxide 19%, and the lime 6%, in which about 2% of the manganese was present in the form of the dioxide, was ground to 200 mesh and different batches thereof were roasted with an excess of air, each batch being roasted at a different temperature up to 1800° F. In roasting these batches at various temperatures and subsequently digesting each batch for seven hours with sodium hydroxide solution, it was found that the percent of the total silica extracted was practically nil until a temperature of over 400° F. was reached. Between 400° F. and 800° F. the percent of total silica extracted varied almost directly as the increase in temperature, being about 40% at the latter temperature. From 850° F. to 1800° F. the percentage of total silica extracted again increased directly as the temperature, but to only about 46%. It will thus be seen that there is a critical range for treating the ore to separate out the maximum amount of silica per degree temperature rise in treatment, and that this range lies between about 400° F. and 850° F.

In treating other types of ore, it was learned that the percent of silica extracted was also depended upon the amount of calcium present, the less calcium present, the greater was the amount of silica extracted. On low calcium ores, the extraction would run over 70%. However, if the concentrate is to be used for the manufacture of ferromanganese the presence of calcium should not be objectionable as it will not materially reduce the available manganese. The greater amount of the silica present will not be found to be combined with the manganese but will be combined with the calcium, and both should flux off during smelting.

The subjection of the limestone in the ore to the oxidation roast at a temperature which will place it in the form of calcium oxide, is desirable as it prevents the formation of sodium carbonate when the ore is later treated with sodium hydroxide.

Other methods of oxidation might be carried out, or the final stages of the process might be carried out on a naturally oxidized ore.

The iron in the ore does not affect any retention of silica in this treatment, but when it is present in excessive amounts for the suitable production of ferromanganese, it may be reduced by a reduction roast and separated magnetically.

The concentration of the caustic solution used in digesting the oxidized ore is usually around 30° Baumé. Other concentrations may be used depending upon the speed of reaction and filterability of the solution.

The caustic may be recovered for reuse by treatment of the sodium silicate filtrate with slack lime, which removes the silica therefrom in the form of calcium silicate.

It is applicant's theory of the process that in the ordinary manganese silicate ores the manganese being in a condition of low valence is tightly linked to the silica. By oxidizing the compound the manganese is placed in a higher valence, and the tightness of the linkage is reduced. Then the silica may be easily split off either by the reaction of a reagent upon the manganese oxide constituent or upon the silica constituent. In many instances the end products of the action of reagents upon the high valent manganese ore are much more desirable than the products of the action of the same reagents on low valent manganese ore.

When claiming herein after the removal of "the silica" from a silicate ore, the quantity of silica intended to be designated is only that quantity possible by the use of the disclosed process.

When referring to a manganese silicate ore, reference is had to a manganese ore having in combination with the manganese of the ore quantities of silica. Other compounds may also be present.

Having thus described my invention, I claim:

1. The process of increasing the availability of manganese in a manganese silicate ore in which the manganese is largely in the divalent form, comprising: comminuting said ore, and increasing the constituent oxygen in the manganese silicate in said ore by means of an oxidizing roast.

2. The process of increasing the availability of manganese in a manganese silicate ore in which the manganese is largely in the divalent form, comprising: comminuting said ore, and increasing the constituent oxygen in the manganese silicate in said ore by means of an oxidizing roast at a temperature above 400° F.

3. The process of increasing the availability of manganese in a manganese silicate ore in which the manganese is largely in the divalent form, comprising: comminuting said ore, and increasing the constituent oxygen in the manganese silicate in said ore by means of an oxidizing roast between 400° F. and 900° F.

4. The process of treating manganese silicate ore to place the manganese in the quadrivalent form, comprising: comminuting said ore, and roasting said ore in an oxidizing atmosphere to place the manganese in the manganese silicate in said ore in the quadrivalent form.

5. The process of increasing the oxygen constituent with manganese in a manganese silicate ore, comprising: comminuting said ore, and subjecting said ore to an oxidation roast until the manganese silicate of said ore is high in oxygen.

6. The process of increasing the availability of manganese in a manganese silicate ore in which the manganese is largely in the divalent form, comprising: comminuting said ore, and increasing the constituent oxygen in said ore by means of an oxidizing roast which will place over twenty percent of the manganese of the manganese silicate in said ore in the quadrivalent form.

7. The process of increasing the availability of manganese in a manganese silicate ore in which the manganese is largely in the divalent form, comprising: comminuting said ore, and increasing the constituent oxygen in said ore by means of an oxidizing roast which will place the limestone in the ore in the form of calcium oxide and the manganese silicate of the ore high in oxygen.

8. The process of treating manganese silicate ore, comprising: comminuting said ore, increasing the constituent oxygen in the manganese silicate in said ore by means of an oxidizing roast, and after said roast liberating silica by digestion with a caustic solution.

9. The process of treating manganese silicate ore, in which the manganese is largely in the divalent form, comprising: comminuting said ore, increasing the constituent oxygen in the manganese silicate in said ore by means of an oxidizing roast, and only after said roast liberating silica by digestion with a caustic solution.

10. The process of increasing the availability of manganese in a manganese silicate ore in which the manganese is largely in the divalent form, consisting of: comminuting said ore, and increasing the constituent oxygen in the manganese silicate in said ore by means of an oxidizing roast.

11. The process of treating manganese silicate ore, consisting of: comminuting said ore, increasing the constituent oxygen in the manganese silicate in said ore by means of an oxidizing roast, and only after said roast liberating silica by digestion with a caustic solution.

12. The process of increasing the availability of manganese in a manganese silicate ore in which the manganese is largely in the divalent form, comprising: comminuting said ore, and increasing the constituent oxygen in the manganese silicate in said ore by means of an oxidizing non-disintegrating roast.

13. The process of increasing the availability of manganese in a manganese silicate ore in which the manganese is largely in the divalent form, comprising: comminuting said ore, and increasing the constituent oxygen in the manganese silicate in said ore by means of an oxidizing roast carried on without an excess of alkali.

14. The process of increasing the availability of manganese in a manganese silicate ore in which the manganese is largely in the divalent form, comprising: comminuting said ore, and increasing the constituent oxygen in the manganese silicate in said ore by means of an oxidizing roast out of the presence of an alkali.

15. The process of increasing the availability of manganese in a manganese silicate ore in which the manganese is largely in the divalent form, comprising: comminuting said ore, increasing the constituent oxygen in the manganese silicate in said ore by means of an oxidizing non-disintegrating roast, and only thereafter liberating silica by digestion with a caustic solution.

16. The process of increasing the availability of manganese in a manganese silicate ore in which the manganese is largely in the divalent form, comprising: comminuting said ore, increasing the constituent oxygen in the manganese silicate in said ore by means of an oxidizing roast carried on without an excess of alkali, and only thereafter liberating silica by digestion with a caustic solution.

17. The process of increasing the availability of manganese in a manganese silicate ore in which the manganese is largely in the divalent form, comprising: comminuting said ore, increasing the constituent oxygen in the manganese silicate in said ore by means of an oxidizing roast out of the presence of an alkali, and only thereafter liberating silica by digestion with a caustic solution.

THOMAS B. ALBIN.